United States Patent [19]

Morimoto et al.

[11] Patent Number: 4,847,911
[45] Date of Patent: Jul. 11, 1989

[54] ELECTRONIC PARTS RECOGNITION METHOD AND APPARATUS THEREFORE

[75] Inventors: Masamichi Morimoto, Osaka; Kazumasa Okumura, Uji; Yoshikazu Okahashi, Ikoma, all of Japan

[73] Assignee: Matsushita Electric Industrial Co., Ltd., Kadoma, Japan

[21] Appl. No.: 118,913

[22] Filed: Nov. 10, 1987

[30] Foreign Application Priority Data

Nov. 12, 1986 [JP] Japan .................. 61-269112

[51] Int. Cl.⁴ .................. G06K 9/00; G06K 9/34
[52] U.S. Cl. .................. 382/8; 382/22; 358/101; 364/490
[58] Field of Search .................. 382/8, 22; 358/101, 358/106, 107; 364/470, 468, 490

[56] References Cited

U.S. PATENT DOCUMENTS

| | | | |
|---|---|---|---|
| 4,604,648 | 8/1986 | Kley | 358/101 |
| 4,651,203 | 3/1987 | Peterson | 358/107 |
| 4,686,565 | 8/1987 | Ando | 358/101 |
| 4,701,859 | 10/1987 | Matsuyama et al. | 364/490 |
| 4,772,125 | 9/1988 | Yoshimura et al. | 358/106 |
| 4,783,826 | 11/1988 | Koso | 382/8 |
| 4,799,268 | 1/1989 | McLean et al. | 382/8 |

Primary Examiner—Leo H. Boudreau
Assistant Examiner—Donald J. Daley
Attorney, Agent, or Firm—Cushman, Darby & Cushman

[57] ABSTRACT

Image of an electronic part is subdivided into a plurality of segments and is taken in a picture area of a video camera, and picture area is shifted in a predetermined direction along a circumference portion or boundary; a characteristic portion positioned on an end portion of the picture area is also included in the beginning part of a successive picture area, and then the positions and shapes of the respective characteristic portions in the successive picture area are detected on the basis of the image data of characterisitc portion at the end portion of the previous picture area.

3 Claims, 7 Drawing Sheets

FIG.1
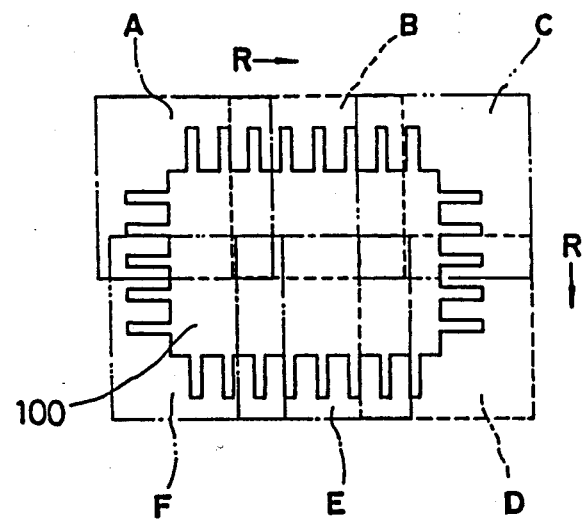
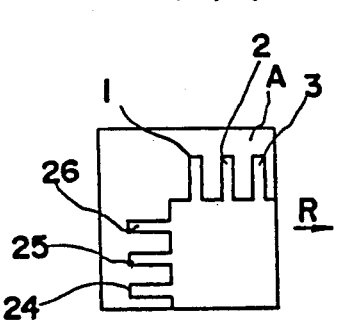
FIG.2(a)
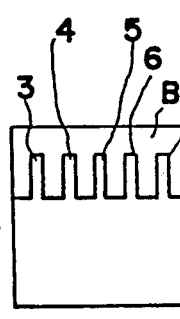
FIG.2(b)
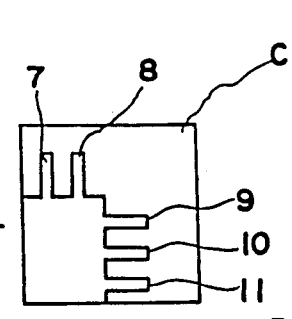
FIG.2(c)
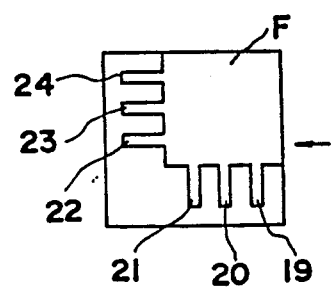
FIG.2(f)
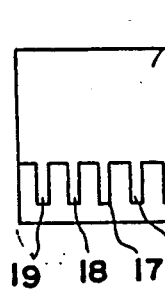
FIG.2(e)
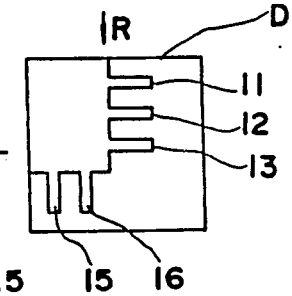
FIG.2(d)

ELECTRONIC PARTS RECOGNITION METHOD AND APPARATUS THEREFORE

FIELD OF THE INVENTION AND RELATED ART STATEMENT

1. Field of the Invention

The present invention relates generally to an electronic parts recognition method, and more particularly to an electronic parts recognition method being applicable to test of leads of a large scale integrated circuit having the leads on all sides thereof such as quad-inpackage, and to a large electronic parts which is too large for covering it in a visual field of a recognizing device.

2. Description of the Related Art

In examination of a number, length and intervals of leads 40 of an integrated circuit 100 in the prior art as shown in FIG. 11, a visual field of a recognition apparatus using a video camera device (not shown) is sequentially shifted in the order of (1), (2), (3), and (4) of FIG. 11, because a recognizing precision is lowered when visual field is wide for covering the integrated circuit 100 in one picture of the video camera device. The above-mentioned shift of the visual field is operated by teaching instructions to the recognition apparatus by manual operation.

Automatizing of the shift of the visual field is easy, in case that the visual field is shifted in a predetermined width or length without consideration of characteristic of an object in each visual field. However, in the above-mentioned method, a positional relation between the respective visual fields can not be recognized owing to shift errors between the respective visual fields. For instance, when two leads are separately shown in two visual fields, the interval between the two leads can not be precisely detected.

In order to overcome the difficulty, the visual field is shifted so that at least one lead is shown in both the visual fields in another prior art. However, since the shift of the visual field is operated by manual operation, an operator of the recognition apparatus is liable to lose sight of a lead aimed in the picture field of the recognizing apparatus, and miscount number of the leads. Furthermore, the manual operation is very troublesome, and a change of teaching is required corresponding to a various electronic parts. Consequently, it causes productivity to lower.

OBJECT AND SUMMARY OF THE INVENTION

An object of the present invention is to provide an electronic parts recognition method for recognizing precisely an electronic parts by automatic shift of a visual field.

An electronic parts recognition method in accordance with the present invention comprises the steps of:

picking up image of a divided shape of an electronic part in a picture area by video means to produce a video signal and detecting characteristic portions from the video signal, shifting picture areas along the characteristic portions of the electronic parts in a predetermined circulating direction around a predetermined center portion of the electronic part in a manner to overlap a characteristic portion at end part of a picture area with a characteristic portion at beginning part of the next picture area, converting the video signal of the video means to a binary signal, detecting boundary squares showing a contour of the characteristic portion on the basis of the binary signal, computing an angle between a reference line and a line connecting centers of two boundary squares which are apart from each other with a predetermined number of the boundary squares, computing angle increments between neighboring two lines, recognizing a position and shape of a corner in the characteristic portion on the basis of maximum angle, recognizing the characteristic portion on the basis of the position and shape of the corner, deciding a shift direction of the picture area on the basis of a shape of the characteristic portion which is at the end of the picture area, and recognizing positions and shapes of the characteristic portions on the basis of the characteristic portion which is at the end of the previous picture area and overlaps with that of the successive picture area.

According to the present invention, in recognition of a position and shape of "a characteristic portion" showing the electronic parts to be examined, all the characteristic portions can be recognized by automatic shift of the picture area along the peripheral portion of the electronic parts in a predetermined direction after teaching an initial position in the picture area, for any kind of the electronic parts. Furthermore, in the respective picture area, a characteristic portion positioned at an end portion of a shift direction of a preceding visual field is included in a successive picture area, and other characteristic portions in the picture area is recognized on the basis of the characteristic portion, and the positions of the respective characteristic portion can be precisely recognized.

BRIEF DESCRIPTION OF THE DRAWINGS

FIG. 1 is a plan view of an electronic parts subdivided to a plurality of picture areas rounding along peripheral portion of an electronic parts in an embodiment of an electronic parts recognition method of the present invention;

FIG. 2(a), FIG. 2(b), FIG. 2(c), FIG. 2(d), FIG. 2(e) and FIG. 2(f) show respective picture area divided to six picture areas;

DESCRIPTION OF THE PREFERRED EMBODIMENTS

FIG. 1 is a plan view of an integrated circuit having leads on four sides shown in picture area of a video camera (not shown) for embodying an electronic parts recognition method in accordance with the present invention. Referring to FIG. 1, the picture of the integrated circuit 100 is divided into six segments in the order as shown by arrows R, and the respective segments are designated by picture areas A, B, C, D, E and F. The respective segments overlap with neighboring segments at each end portion.

Figure 9:
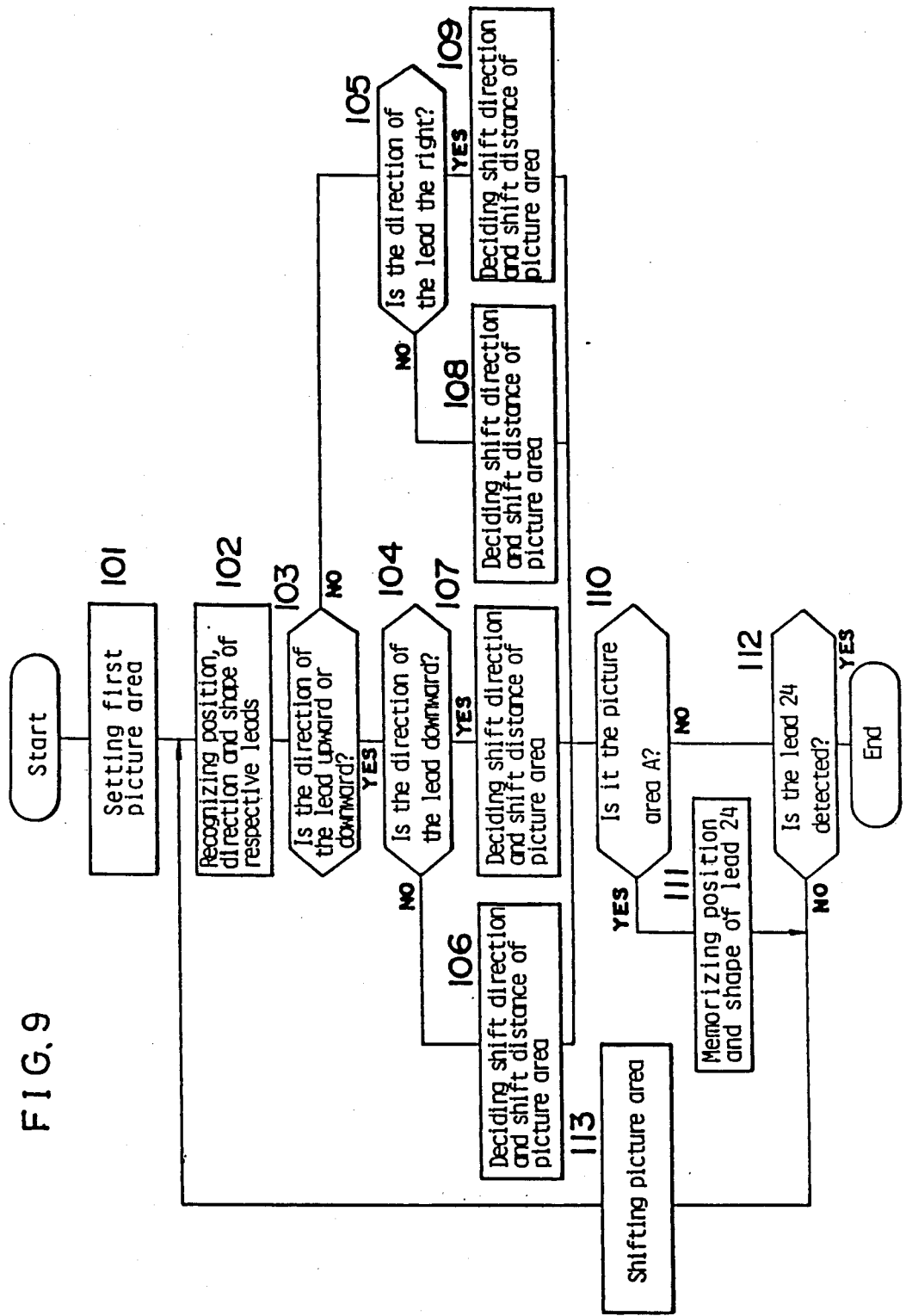
FIG. 9 is a flow chart showing operation for embodying the present invention.

FIG. 2(a), FIG. 2(b), FIG. 2(c), FIG. 2(d), FIG. 2(e) and FIG. 2(f) show the picture areas A, B, C, D, E and F, respectively. FIG. 2(a) shows the picture area A showing a left-upper portion of the integrated circuit 100. FIG. 2(b), shows the picture area B showing a central upper portion thereof, and FIG. 2(c) shows the picture area C showing a right-upper portion thereof. FIG. 2(d) shows the picture area D showing a right-lower portion, and FIG. 2(e) shows the picture area E showing a central lower portion, and FIG. 2(f) shows the picture area F showing a left-lower portion thereof. The respective leads are designated by numerals 1, 2, 3, ... 24, 25 and 26 clockwise around the integrated circuit 100. Operation of the present invention is shown by a flow chart in FIG. 9.

Firstly, a video camera for detecting a shape of the integrated circuit 100 is positioned in a manner to detect the picture area A of the left-upper portion of the integrated circuit 100 as shown in FIG. 2(a) (Step 101). Then, the positions, directions and shapes of the respective leads 24, 25, 26, 1, 2 and 3 in the picture area A are recognized by known shape recognition method described hereinafter (Step 102). In the embodiment, a shift direction of the picture area is selected clockwise with respect to the center of the integrated circuit 100. Then, the direction of the length of the lead 3 positioned at the end portion of the picture area A is examined (Steps 103, 104 and 105). Referring to FIG. 2(a), since a direction of the length of the lead 3 positioned at right end of the picture area A is upper, a shift direction of the picture area A is recognized to be right, and a shift distance of the picture area is decided so that the lead 3 in the picture area A is included in the successive picture area B (Step 106). Then, it is examined that whether a picture area under operation is the picture area A, and the position and shape of the lead 24 is memorized (Steps 110 and 111). In the picture area B, positions and shapes of the leads 4, 5, 6 and 7 are recognized by using the lead 3 as a reference. A shift distance between the picture areas A and B is decided so that the lead 3 is positioned on the left end portion of the picture area B. The positions and shapes of the respective leads 3-7 are recognized in the picture B. Subsequently, an error of the actual shift distance between the picture areas A and B with respect to a set value of a shift distance is detected from a positional data of the lead 3 detected in the successive picture area B and that detected in the first picture area A, and thereby the positional data of the respective leads 3-7 obtained in the picture area B are compensated.

Secondary, the picture area is shifted rightward in a manner to include the lead 7 since the direction of the end lead 7 in the picture area B protrudes upward, and thus the picture area C is obtained (Step 103). In the picture area C, the positions and shapes of the respective leads 7, 8, 9, 10 and 11 are recognized. Since the lead 11 positioned on lower portion of the picture area C protrudes rightward (Step 109), the picture area is shifted downward (Step 113), and the picture area D is obtained. The positions and shapes of the respective lead 11, 12, 13, 14 and 15 are recognized in the picture area D (Step 102). In the picture area D, since the lead 15 positioned on the left end portion of the picture area D protrudes downward the picture area is shifted leftward (Step 107), and the picture area E is obtained. In the similar manner, the lead 15 positioned in left end portion in the picture area D is included in the picture area E, and the positions and shapes of the respective leads 15, 16, 17, 18 and 19 are recognized in the picture area E (Step 102). Successively, the picture area is shifted leftward because the lead 19 positioned on the left end portion of the picture area E protrudes downward (Step 107), and thus the picture area F including the lead 19 is obtained. Then, since the lead 24 positioned on upper end portion of the picture area F is detected again (Step 112), the flow goes to "End".

Figure 3:
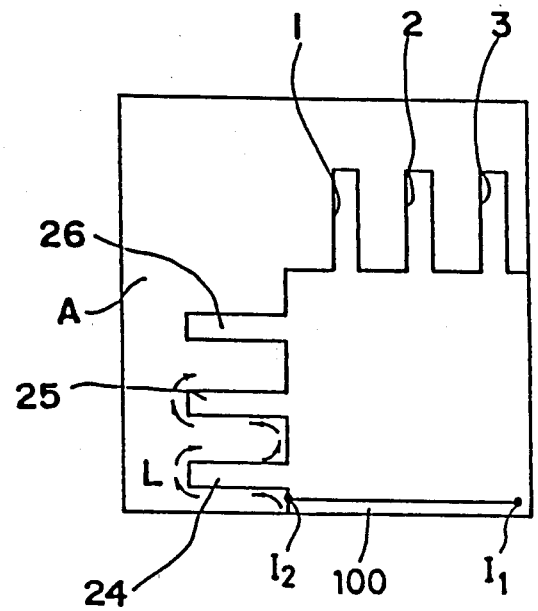
FIG. 3 is a picture area showing characteristic portions of the electronic parts.

As a result, the picture areas A-F round clockwise along the peripheral portion of the integrated circuit 100, and all the leads 1-26 are detected. A boundary detection method as an example for recognizing a position and direction of the lead on the respective picture area of the above-mentioned recognition process, is shown in FIG. 3-FIG. 7. Referring to FIG. 3, the left-upper portion of the integrated circuit 100 is positioned on the picture area A. A shape recognition process is started from an initial point $I_1$ in a silhouette region of the integrated circuit 100, and a boundary recognition process elucidated hereinafter is started from a point $I_2$.

Figure 10:
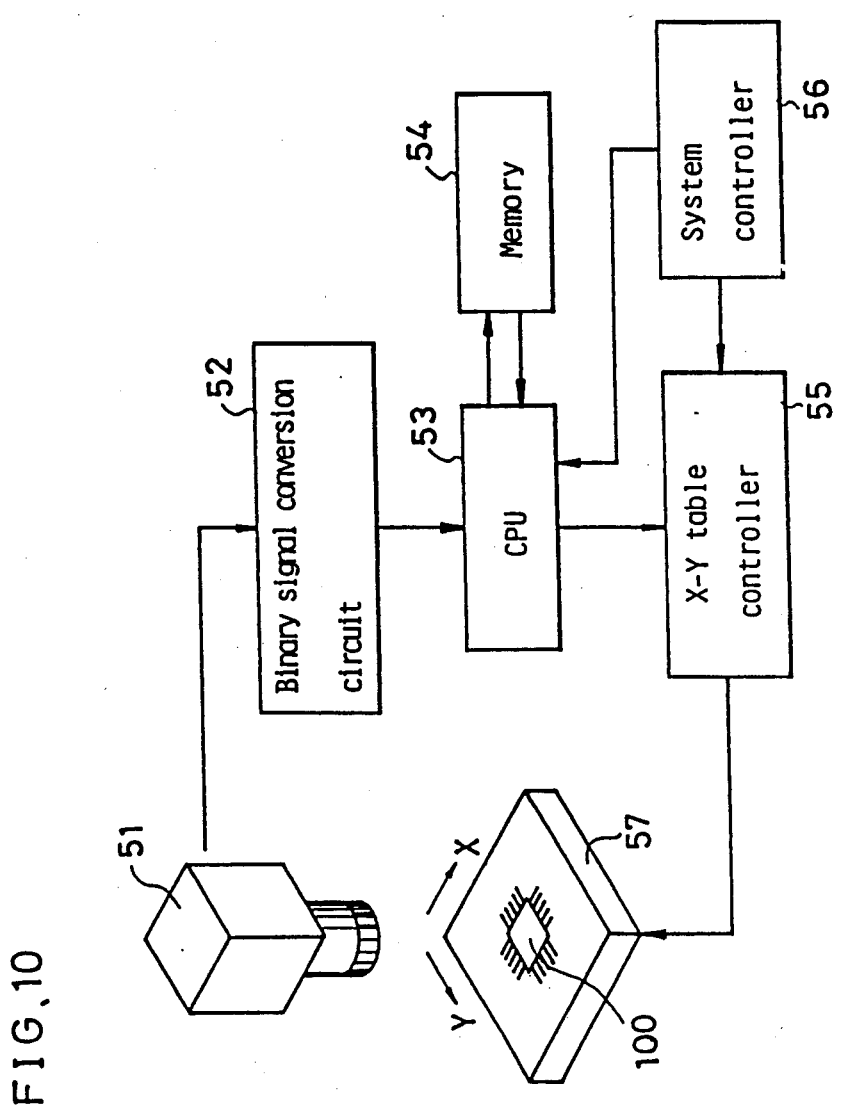
FIG. 10 is a block diagram of the embodiment.
Figure 11:
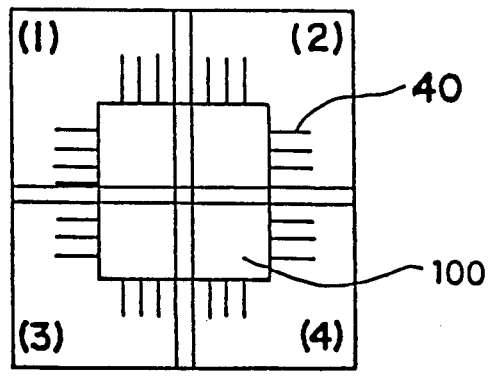
FIG. 11 is the plan view of the electronic parts in the prior art.

An apparatus for embodying the present invention is shown in FIG. 10. Referring to FIG. 10, a video camera 51 detects the integrated circuit 100 set on an X-Y table 57. The detected signal of the video camera is inputted to a binary signal conversion circuit 52. The output signal of the binary signal conversion circuit 52 is applied to a CPU 53 and a memory 54. Data from the CPU is output to the X-Y table controller 55 for shifting the X-Y table 57. An initial position of the X-Y table is set in a system controller 56.

Figure 4:
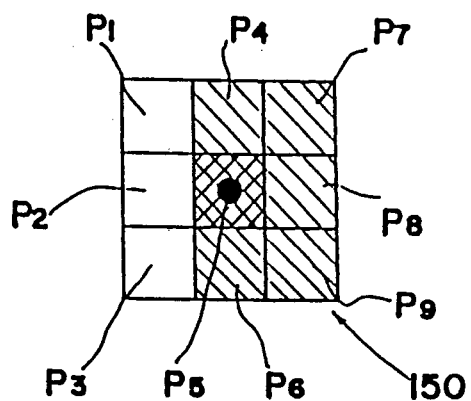
FIG. 4 is a figure showing a method for recognizing a boundary of the characteristic portion.

The image of the lead which is detected by the video camera 51 is converted to binary signal by the binary signal conversion circuit 52 showing the silhouette of the lead by hatched cells and blank cells as shown in FIG. 4.

Figure 5:
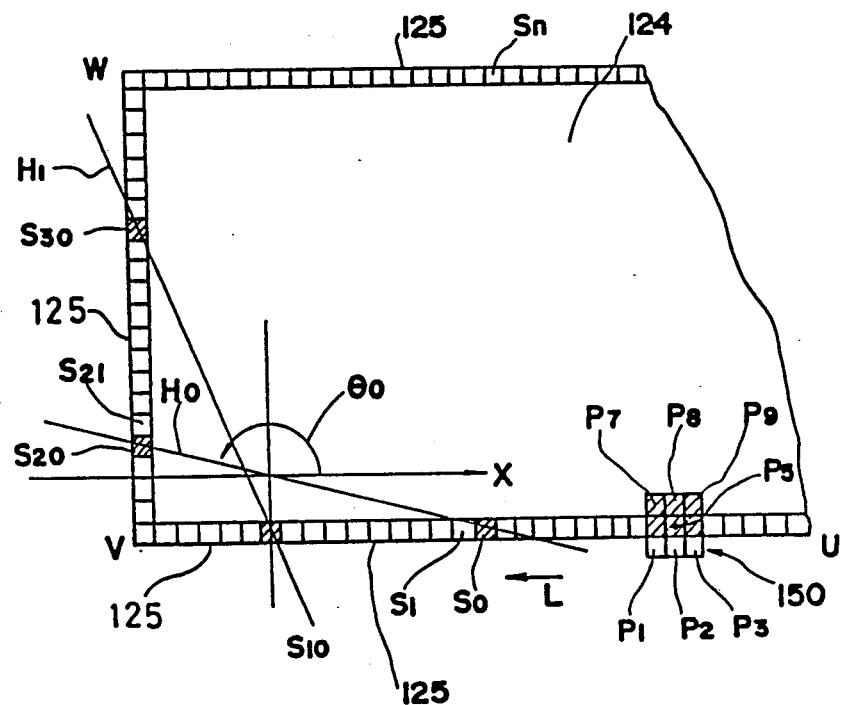
FIG. 5 is a figure showing a method for computing angle differences.

FIG. 4 and FIG. 5 show the generally known shape recognition method. Referring to FIG. 4 and FIG. 5, a boundary 125 of a silhouette 124 of the lead is detected by the following boundary detection process. A mask 150 which has a window of a square region consisting of nine square cells $P_1$, $P_2$, $P_3$, $P_4$, $P_5$, $P_6$, $P_7$, $P_8$ and $P_9$, for example, are defined as shown in FIG. 4, and the boundary 125 of the silhouette region 124 is traced by the mask 150. In the boundary detection process, when at least the central cell $P_5$ exists in the silhouette region 124 and some cells $P_1$, $P_2$ and $P_3$ are outside of the silhouette 143, it is recognized that the central cell $P_5$ of the mask 150 is on the boundary. The mask 150 is shifted clockwise along the boundary 125 as shown by an allow L in FIG. 3 and FIG. 5, and the boundary 125 as shown in FIG. 5 is detected.

Subsequently, a boundary square $S_0$ on the boundary 125 is decided as a starting point. A predeterminded number of boundary squares, for example, 20 in the embodiment, are counted clockwise on the boundary

125 starting from the boundary square $S_0$ and is designated as a boundary square $S_{20}$. A line connecting centers of the boundary squares $S_0$ and $S_{20}$ is designated as $H_0$, and an angle $\theta_0$ between the line $H_0$ and a horizontal line X is computed from data showing positions of boundary squares $S_0$ and $S_{20}$.

Successively, contiguous boundary squares $S_1$ and $S_{21}$ are connected by a line $H_1$, and an angle $\theta_1$ between the line $H_1$ and the horizontal line X is calculated. In the similar manner, all lines connecting two boundary squares which are apart from each other with the predetermined number of the boundary squares are obtained, and angles $\theta_1, \theta_2, \theta_3, \ldots \theta_n$ are computed. Subsequently, angle increments $D\theta_1, D\theta_2, \ldots D\theta_n$ between neighboring two angles $\theta_0$ and $\theta_1$, $\theta_1$ and $\theta_2$, and $Q_2$ and $Q_3$, $\ldots Q_{n-1}, Q_n$ are computed. A value of the angle increment $D\theta_n$ is zero when the two lines $H_i$ and $H_{i+1}$ are both on a straight boundary ("i": natural number). When the line connecting centers of two boundary squares which are not on the same straight boundary, the value of the angle increment $D\theta$ is not zero. When the central boundary square $s_{i+10}$ of two boundary squares $S_i$ and $S_{i+20}$ is on a corner V, for example, the value of the angle difference $D\theta$ is maximum. Moreover, the angle difference $D\theta$ is shown by a plus quantity on a convex corner and is shown by a minus quantity on a concave corner under a condition of a clockwise operation.

Figure 6:
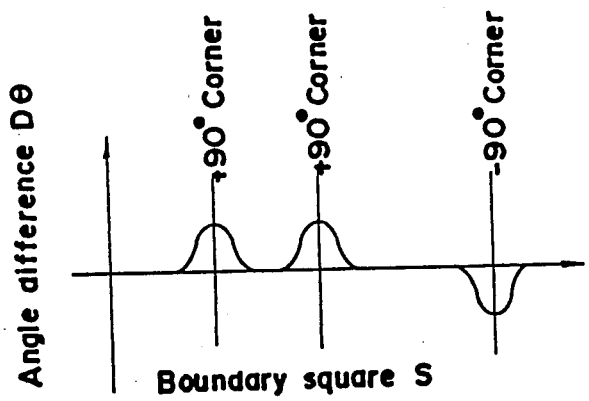
FIG. 6 is a graph showing a relation of the angle increment and a boundary square.

FIG. 6 is a graph showing a relation of the angle increment $D\theta$ and the boundary squares S. The ordinate is graduated by the angle difference $D\theta$ and the abscissa is graduated by the boundary squares S.

Figure 7:
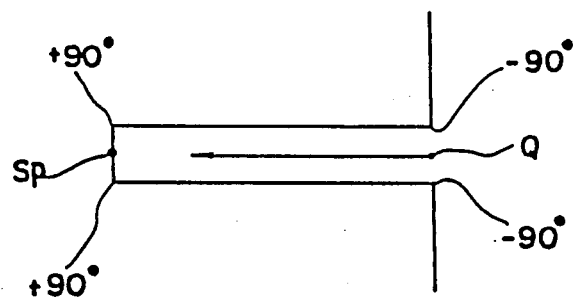
FIG. 7 is a figure showing a method for detecting a direction of a lead.

Referring to FIG. 6, a position and shape of a lead are detected by a position of the boundary square S having a maximum angle difference $D\theta$ and a polarity of the angle difference $D\theta$, respectively. Furthermore, as shown in FIG. 7, a central position $S_p$ of the end of lead is recognized as a central position of neighboring two corners each having plus maximum value of the angle increment $D\theta$. Then, a central position Q of a base portion of the lead is recognized by detecting a central point of two corners having a minus maximum angle increment $D\theta$, and the length and direction of the lead is recognized by relative position of the central positions $S_p$ and Q.

As a result, the positions, lengths and intervals of the respective lead in the picture area A–F are recognized in the above-mentioned method. Furthermore, the shift direction and shift distance of the picture area are detected from the protruding direction and position of the lead which is positioned on an end portion of the respective picture area, respectively, and a subsequent shift direction and shift distance are automatically decided.

Figure 8:
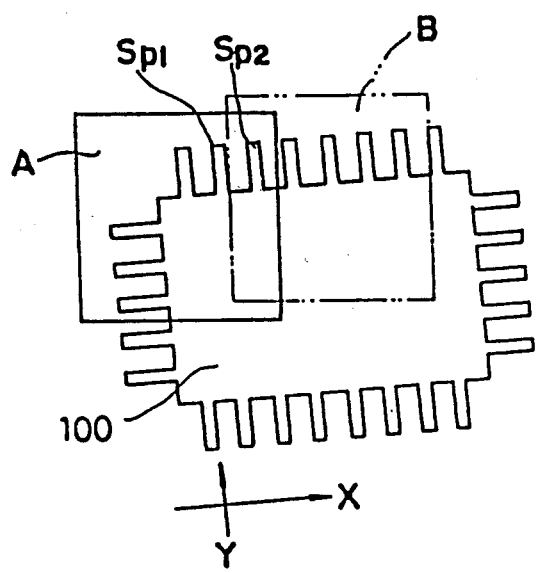
FIG. 8 is a plan view of the electronic parts in pictures areas rounding the peripheral portion thereof in another embodiment.

In the above-mentioned example, the picture area is shifted to a horizontal direction or vertical direction with respect to the picture area A. In case where the integrated circuit 100 is tilted with respect to the horizontal line of the picture area A as shown in FIG. 8, an inclination of the integrated circuit is detected from a difference in the horizontal positions of central positions $S_p$ of two leads. Then, the subsequent picture area is shifted to both horizontal and vertical directions corresponding to the inclination.

In the embodiment, in case where the electronic parts tilts in the picture area, overflow of the characteristic portions goint out from the picture area is prevented by shift operation of the picture area.

In the above-mentioned embodiments, the boundary detection method is used to recognize the lead of the integrated circuit 100, and hence the pattern matching method generally known to recognize the pattern is usable to detect the lead.

The present invention is applied to detect the lead of the integrated circuit as mentioned above. Moreover, the present invention is applicable to recognize positions and shapes of the various characteristic portion of other electronic parts. In such case, the shift direction of the picture area are selected on the basis of mode of the characteristic portion as replacement for the direction of the leads.

What is claimed is:

1. An electronic parts recognition method comprising the steps of:

picking up image of a divided shape of an electronic part in a picture area by video means to produce a video signal and detecting characteristic portions from said video signal, shifting picture areas along the characteristic portions of said electronic parts in a predetermined circulating direction around a predetermined center portion of said electronic part in a manner to overlap a characteristic portion at end part of a picture area with a characteristic portion at beginning part of the next picture area, converting said video signal of the video means to a binary signal, detecting boundary squares showing a contour of the characteristic portion on the basis of said binary signal, computing an angle between a reference line and a line connecting centers of two boundary squares which are apart from each other with a predetermined number of the boundary squares, computing angle increments between neighboring two lines, recognizing a position and shape of a corner in the characteristic portion on the basis of maximum angle, recognizing the characteristic portion on the basis of the position and shape of the corner, deciding a shift direction of the picture area on the basis of a shape of the characteristic portion which is at the end of said picture area, and recognizing positions and shapes of the characteristic portions on the basis of the characteristic portion which is at the end of the previous picture area and overlaps with that of the successive picture area.

2. An electronic parts recognition method comprising the steps of:

picking up image of a divided shape of an electronic part in a picture area by video means to produce a video signal and detecting characteristic portions from said video signal, shifting picture areas along the characteristic portions of said electronic parts in a predetermined circulating direction corresponding to an inclination of the electronic parts being detected on the basis of a difference in the horizontal position of the picture area of a plurality of the characteristic portions, in a manner to overlap a characteristic portion at end part of a picture area with a characteristic portion at beginning part of the next picture area, converting said video signal of the video means to a binary signal, detecting boundary squares showing a contour of the characteristic portion on the basis of said binary signal, computing an angle between a reference line and a line connecting centers of two boundary squares which are apart from each other with a predetermined number of the boundary squares, computing angle increments between neighboring two lines, recognizing a position and shape of a corner in the characteristic portion on the basis of maximum angle, recognizing the characteristic portion on the basis of the position and shape of the corner, deciding a shift direction of the picture area on the basis of a shape of the characteristic portion which is at the end of said picture area, and recognizing positions and shapes of the characteristic portions on the basis of the characteristic portion which is at the end of the previous picture area and overlaps with that of the successive picture area.

3. An electronic parts recognition apparatus comprising:

a video camera for picking up image of a divided shape of an electronic part in a picture area to produce a video signal and detecting characteristic portions from said video signal, binary signal conversion circuit for converting said video signal to a binary signal, computing means for detecting boundary squares showing a contour of the characteristic portion on the basis of said binary signal, computing an angle between a reference line and a line connecting centers of two boundary squares which are apart from each other with a predetermined number of the boundary squares and angle increments between neighboring two lines, recognizing a position and shape of a corner in the characteristic portion on the basis of maximum angle, recognizing the characteristic portion on the basis of the position and shape of the corner, deciding a shift direction of the picture area on the basis of a shape of the characteristic portion which is at the end of said picture area, and recognizing positions and shapes of the characteristic portions on the basis of the characteristic portion which is at the end of the previous picture area and overlaps with that of the successive picture area, and an X-Y table controller for driving an X-Y table having said electronic part in order to shift picture area along the characteristic portions of said electronic parts in a predetermined circulating direction around a predetermined center portion of said electronic part in a manner to overlap a characteristic portion at end part of a picture area with a characteristic portion at beginning part of the next picture area.

* * * * *